United States Patent [19]
Kattenberg

[11] Patent Number: 4,704,292
[45] Date of Patent: Nov. 3, 1987

[54] COCOA

[75] Inventor: Hans R. Kattenberg, Zaanstad, Netherlands

[73] Assignee: Cacaofabriek De Zaan B.V., Netherlands

[21] Appl. No.: 807,472

[22] Filed: Dec. 10, 1985

[30] Foreign Application Priority Data

Dec. 10, 1984 [NL] Netherlands ........................ 8403748

[51] Int. Cl.$^4$ ......................... A23G 1/00; A23G 9/00; A23L 1/187
[52] U.S. Cl. .................................. 426/565; 426/579; 426/593; 426/584; 426/631
[58] Field of Search ............... 426/631, 579, 593, 584, 426/565

[56] References Cited

U.S. PATENT DOCUMENTS 2,835,592  5/1958  Rusoff .
3,056,677  10/1962  Colten et al. .
4,435,436  3/1984  Terink et al. .

FOREIGN PATENT DOCUMENTS 66304    12/1982  European Pat. Off. .
1100109  9/1955   France .
6605854  10/1966  Netherlands .

OTHER PUBLICATIONS

G. Andersen, "Beitrag Zur Subgerinnung Von Kakaotrunk", Milchwissenschaft 18, pp. 161–163, Hildesheim (1963).
F. Villeneuve, "Study of Cocoa Polyphenols during Fermentation", 3d Cycle Thesis, Montpellier, France (1982).
H. Fincke, "Handbuch Der Cacao Erzeugnisse", Springer Verlag, Berlin, pp. 296–308; Tables 40, 41 (1965).

Primary Examiner—Jeanette Hunter
Attorney, Agent, or Firm—R. A. Bleeker; M. J. McGreal

[57] ABSTRACT

A cocoa which has a simple polyhydroxyphenols content of more than about 0.25 percent by weight produces chocolate milk products which are more stable and chocolate pudding products which have a higher gel strength.

20 Claims, No Drawings

COCOA

The invention relates to an improved cocoa, particularly to a cocoa suitable for the manufacture of milk-based beverages and milk-based desserts, such as stabilized and sterilized chocolate flavoured milk, jellied chocolate flavoured desserts such as puddings, and chocolate flavored ice-cream. This invention also relates to foodstuffs which contain the improved cocoa, and in particular to semi-finished products for the manufacture of dairy products, more specifically chocolate flavored milk and chocolate flavored desserts of the pudding type.

Cocoa or cocoa powder is obtained by grinding roasted, cleaned and deshelled cocoa beans to a paste, called cocoa mass or chocolate liquor, followed by the extraction of part of the fat by pressing and finally milling the press cake. More often than not cocoa beans, or one of the intermediate products mentioned above, are processed as well, for example treated with a solution of a hydroxide or carbonate of sodium or potassium, with the object of obtaining a product with a less astringent and richer taste and a deeper and therefore more attractive color. Natural process cocoa powder, which is a cocoa powder that is not processed with alkali, is characterized by a pronouncedly tart and astringent taste and a light color, best described as tan to light-brown. Slightly processed cocoa powders have a less tart and less astringent taste and show a light-brown to red-brown color. Medium processed cocoa powders combine a rich and strong cocoa flavor with an intense red-brown to red color. It is also possible to manufacture intensely processed cocoa powders with a very intense red-brown to deep red color. The expressions "slightly processed" and "intensely processed" respectively as used here refer to the cocoa powder type, as defined by the intensity of its color.

The characterization of cocoa powder colors as mentioned above is highly subjective. For an objective characterization, the color can be specified by color coordinates. A system frequently used and also used in the present application, has been developed by R. S. Hunter. In this system three color coordinates are determined in a standardized way, with a coordinate 'L' indicating the color brightness on a scale from black ($L=0$) to white ($L=100$), a coordinate 'a' indicating the redness and a coordinate 'b' indicating the yellowness. In particular, the coordinate 'L' is characteristic of and describes the degree of processing of cocoa powders. As an example, for the various types of cocoa powder the following levels for the L-coordinate are found for a suspension of the cocoa powder jellified with agar measured with a Hunterlab Digital Color Difference meter, type D25D2A.

| Cocao powder type | Levels for L |
| --- | --- |
| Natural process | above 20.0 |
| Slightly processed | above 18.0 to 20.0 |
| Medium processed | above 16.0 to 18.0 |
| Intensely processed | 16.0 or less |

The method for performing these measurements consists of weighing 1.2 g of the cocoa powder into a 100 ml breaker and adding 5 ml of water at 60° C. This mixture is stirred until a homogeneous paste is obtained. 45 g of a freshly prepared 2.5% agar solution of 50° C. is then added with rapid mixing until the mixture is homogeneous. The mixture is then poured as quickly as possible into a Petri dish which is lying exactly level and allowed to cool for 15 minutes. The agar slab which is thus obtained is removed from the Petri dish by means of a broad spatula and placed on a white tile. The tile with the slab is inserted into the calibrated Hunterlab Digital Color Difference Meter and the slab is pressed lightly against the measuring orifice, without protrusion of the surface of the slab into the apparatus. The L-, a- and b-values are then directly read from the Hunterlab Digital Color Difference Meter.

For numerous industrial applications the use of intensely colored cocoa powders, e.g., the types which have been described as intensely processed, with an L-coordinate of 16 at the maximum, has proved to be very advantageous. Due to their rich taste and high coloring capacity these types have economical advantages, and they also enable the manufacture of finished products with an attractive deep chocolate color. A specific intensely processed cocoa power of this type has been described in EP 82 200147 (published under number 0066304). This cocoa power combines an intense color (L-value less than 16) with a pH of 7.5 or less and a ratio of pH:alkalinity of the ash below 0.046 while no more acid radicals are present than those naturally present in fermented cocoa. This cocoa powder does not show the normal disadvantages of the usual intensely processed cocoa powders which are treated with large amounts of alkali, such as an undesirable alkaline or salty taste. Also, the cocoa is very suitable for use in all kinds of cocoa containing products for which an intense color is desirable. However, if one uses these types of cocoa powders for the industrial preparation of dairy products, such as stabilized and sterilized chocolate flavored milk or chocolate desserts, specific drawbacks are encountered. The main ingredients for chocolate flavored milk are milk (which is here understood to include partly or wholly skimmed milk), sugar and cocoa. Only part of the cocoa dissolves in the liquid. The remaining solids particles have a density which is considerably greater than that of the liquid, resulting, if no special measures are taken, in a rapid settling of the cocoa particles. Since consumers prefer a homogeneous beverage, manufacturers add a stabilizing agent, viz. a small quantity of a vegetable hydrocolloid, normally carrageenan. In order to obtain a long shelf life, the mixture is sterilized and then bottled. After filling and closing, the bottles and their contents are sterilized again. It is also possible to fill paperboard or plastic containers aseptically with the sterilized chocolate flavored milk. In practice chocolate flavored milk manufactured by these methods can exhibit visual quality defects, often described as "physical curdling" or "marbling". This phenomena is particularly disadvantageous as it often appears only after a few days and because the consumer associates it wrongly with bacteriological deterioration, that is, a soured milk. From this it follows that the chocolate flavored milk becomes unsalable shortly after its delivery to the retailers. Even in non-transparent packaging the above-mentioned quality defects are undesirable since they yield concentration variations of the cocoa component, resulting in irregularities as to color and taste of the chocolate flavored milk when served. These visual quality defects may result from the composition or the properties of the milk used and/or the nature of the stabilizer, and processing conditions which are used. It is well known also that the type of the cocoa used can be responsible for the occurrence of some visual quality defects. In particular the intensely processed types of cocoa power described above can cause a marbling or curdling phenomena.

Since the chance of marbling or curdling occurring is great with certain types of cocoa powder these types are not recommended for the manufacturers of stabilized and sterilized chocolate flavored milk, in spite of their otherwise attractive organoleptic properties. Much work has been undertaken to find a criterium for the suitable use of cocoa powders for diary applications. Dr. G. Anderson (Milchwissenschaft 18, (1963), 161–3; Deutsche Milchwirtschaft, Hildesheim, 22/1971/000–5) attaches much value to the tannin (high polymeric polyhydroxyphenols) content of cocoa powder. According to him this should not be too high. In order to check the accuracy of this statement the tannin content of a number of samples of cocoa powder was determined with the aid of hide powder (a dried defatted animal hide uses to determine tannins content), by means of the so-called filter method. This method has been officially accepted by the "Kommission fur Chemische Lederanalyse" of the German "Verein fur Gerbereichemie und -Technik" (Working Party On the Chemical Analysis Of Leather Of The German Association For Tanning Chemistry And Technology). Stabilized and sterilized chocolate flavored milks were prepared, according to usual recipes and methods. Preliminary tests had shown the best milk and stabilizer to be used as well as the processing conditions to be optimum for a product which would not show visual defects. The results are summarized in the following table:

TABLE

| Test No. | Cocoa Powder Type | Tannic acid content (%, on dry material) | Result |
|---|---|---|---|
| I. | Natural processed | 8.7 | Slight curdling |
| II. | Slightly processed | 13.0 | Nearly homogeneous, small light collar |
| III. | Medium processed | 12.0 | Heavy curdling |
| IV.(a) | Intensely processed (1) | 12.7 | Heavy curdling |
| IV.(b) | Intensely processed (2) | 12.7 | Heavy curdling |

(1) Intensely processed cocoa purchased on the market.
(2) Intensely processed cocoa according to EP 82 200147.

From these laboratory experiments it becomes evident that the tannin content of the cocoa powder is an incorrect criterium for the suitability of a cocoa powder from the point of view of the occurrence of visual defects in chocolate flavored milk. The natural process cocoa is unsuitable for color and flavor reasons, but also because it increases the tendency of milk proteins to coagulate under the influence of sterilization, due to its pH-reducing properties. In chocolate flavored desserts of the pudding type the firmness and spoonability are important quality characteristics. As a yardstick for these properties serves the gel strength as measured with a Stevens LFRA Analyzer with a standard plunger mounted. Pudding of good quality has a gel strength of at least 36 g (plunger speed 1 mm/sec and plunger displacement 10 mm). However, medium and intensely processed cocoa types, which color and tastewise would be advantageous to the dairy products in question, affect the above quality characteristics, as is illustrated by the following tests. Chocolate pudding was prepared using the various types of cocoa powder and according to the following recipe:

| | |
|---|---|
| Milk, standardized at a fat content of 3.5% | 1 l |
| Sugar | 90 g |
| Corn starch | 18 g |
| Carrageenan (Genulacta P-100, Hercules) | 2 g |

Sugar, corn starch, cocoa powder and carrageenan were carefully mixed and added to the milk. The mixture was heated to 90° C. while stirring and was kept at this temperature for 15 minutes. Then it was cooled to 40° C. under continued stirring and poured into bowl-shaped cups measuring 300 ml, having an upper diameter of 11.5 cm and a flat bottom with diameter 5.5 cm. The height of the pudding layer in the cups was 4.0 cm. After keeping them at 5° C. over night the jellified pudding desserts were turned on a level plate and the gel-strength, being a measure for the visco-elastic properties, was immediately measured by means of the Stevens LFRA Analyzer using the standard plunger. The results were as follows:

| Test No. | Cocoa Powder Type | Gel Strength of the Pudding (in g, plunger speed 1 mm/sec, displacement 10 mm) |
|---|---|---|
| V. | Natural processed | 40.6 |
| VI. | Slightly processed | 38.7 |
| VII. | Medium processed | 33.2 |
| VIII. | Intensely processed | 31.2 |

By these tests it is demonstrated that is not possible to obtain the preferred dark chocolate color of the pudding by using the presently known medium to intensely processed cocoa types without impairing the gel strength.

It is an objective of the invention to provide cocoa which, although in color corresponds with intensely processed types of cocoa powder, does not contrary to the known cocoa powders of this type give rise to visual defects in chocolate flavored milk prepared with it or only to an acceptable degree, and/or does not cause or hardly cause decrease in gel strength of chocolate desserts of the pudding type equally prepared with the cocoa of the invention.

Surprisingly it has been discovered that cocoa powders, corresponding in color with the intensely processed types do not, or to a considerably less degree, give rise to curdling phenomena in stabilized and sterilized chocolate flavored milk and do not, or hardly cause a decrease in gel strength in pudding type desserts, provided their simple polyhydroxyphenols content, as determined according to the method "described hereafter is at least 0.25% by weight. As used in this application for patent, simply polyhydroxyphenols means low polymers of polyhydroxyphenol having a molecular weight of less than about 3000 such as the monomeric catechins like (+)− catechin and (−)− catechin, the dimeric procyanidins B1 to B5, the trimeric procyanidin C1, and other related components not yet well identified in cocoa. A. Fincke et al. in the 'Handbuch der Cacaoerzeugnisse', Springer Verlag, Berlin 1965 pages 297–309 described a number of monomeric and polymeric polyhydroxyphenols which have been found in non-fermented and fermented cocoa beans. Although Fincke noted in passing products made from cocoa, nothing is said about the content of processed cocoa powders with respect to these compounds."

Consequently, the present invention relates to improved cocoa having a color coordinate L of 16 or less and a simple polyhydroxyphenols content of at least about 0.25% by weight. The simple polyhydroxyphenols content of cocoa is determined by means of high pressure liquid chomatography (HPLC) of an acetone/water (3:1 v/v) extract of chloroform-defatted cocoa powder, with gallic acid serving as an internal chromatographic standard. This method is described in F. Villeneuve, Etude Des Polyphénols Du Cacao Au Cours De La Fermentation, Thèse de 3ième cycle, Université des Sciences Techniques du Lanquedoc, Montpellier, France, 1982. (F. Villeneuve, Study On Cocoa Polyphenols During Fermentation, 3rd Cycle Thesis, Technical University of the Languedoc, Montpellier, France 1982). Preferably the improved cocoa of this invention has a simple polyhydroxyphenols content of or above about 0.30% as this results in a chocolate flavored milk with the least tendency to curdle and a chocolate pudding with optimum firmness.

EXAMPLE I

This Example I and Example II illustrate the production of a chocolate milk. Chocolate flavored milk was prepared according to the following recipe:

| | |
|---|---|
| Skim milk (prepared by dissolving 95 g skim milk powder per liter of water) | 10 l |
| Sugar | 600 g |
| Cocoa powder "A" | 150 g |
| Stabilizer (Carrageenan, Genulacta K-100, Hercules) | 2 g |

Cocoa powder "A" was a cocoa power according to the invention, with fat content 10.9%, moisture content 4.3%, pH 7.6 (measured in 10% suspension in boiling water, cooled down to ambient temperature), L-value 14.7 and simple polyhydroxyphenols content of 0.31%. The cocoa powder, sugar and stabilizing agent were carefully mixed and added to the milk. The mixture was heated to 75° C. while stirring and homogenized at this temperature and a pressure of 167 bar using a Rannie homogenizer.

After bottling, the bottles were closed with a crown cap and sterilized in a Stock Rotorzwerg sterilizing autoclave at a heating medium temperature of 120° C. (pressure 1.5 bar) for 15 minutes. After cooling down to 20° C. the chocolate flavored milk in the bottles was examined for its visual aspects and kept at room temperature. After three days and ten days' standing the appearance was examined again. The chocolate flavored milk did not show any marbling or curdling. In comparison a test was performed according to the following Example II.

EXAMPLE II

Chocolate flavored milk was prepared according to the recipe and method described in Example I, however, with cocoa powder "B" having the following analysis: fat content 10.7%, moisture content 4.5%, pH, measured as described in Example I, 7.9, L-coordinate 15.0, simple polyhydroxyphenols content 0.22%. The chocolate flavored milk, prepared with cocoa powder "B" showed a pronounced curdling immediately after sterilization and cooling to 20° C. On shaking the bottles this curdling disappeared for a short time. After three days' and ten days' standing, marbling to a heavy degree was visible with the liquid being divided into a light-colored upper layer with slight curdling and a dark-colored heavily marbled bottom layer.

After these tests, it was checked whether the pH difference existing between the cocoa powder "A" and "B", could possibly influence the appearance of the chocolate flavored milk, as described in the Examples I and II. To this end, potassium carbonate was added to cocoa powder "A" until a pH of 7.9 (being the pH of "B") was obtained, if measured according to the method described in Example I, and citric acid was added to cocoa powder "B" to obtain a pH of 7.6 (the pH of "A"). The so obtained cocoa powders, designated as "A-7.9" and "B-7.6" respectively, were used to prepare chocolate flavored milk according to the recipe and method as described in Example I. The results with regard to the appearance of the chocolate flavored milk, when examined after standing three and ten days were as follows:

| Cocoa Powder used | Appearance Chocolate Flavored Milk |
|---|---|
| "A-7.9" | Homogeneous, without marbling or curdling |
| "B-7.6" | Heavy marbling, light and dark layers |

EXAMPLE III

Example III and Example IV illustrate the effect of the use of the cocoa powder of this invention on the gel strength of a chocolate pudding. Chocolate pudding was prepared according to the following recipe:

| | |
|---|---|
| Milk, standardized at fat content of 3.5% | 1 l |
| Sugar | 90 g |
| Corn starch | 65 g |
| Cocoa powder "A" | 18 g |
| Carrageenan (Genulacta P-100, Hercules) | 2 g |

Sugar, corn starch, cocoa powder and carrageenan were carefully mixed and added to the milk. The mixture was heated to 90° C. with stirring and kept at this temperature for 15 minutes, cooled to 40° C. under continued stirring and poured into bowl-shaped cups measuring 300 ml, having an upper diameter of 11.5 cm and a flat bottom with diameter 5.5 cm. The height of the pudding layer in cups was 4.0 cm.

After keeping them at 5° C. during the night the jellified pudding desserts were turned on a level plate and the gel strenght was immediately measured. This amounted to 37.9 g. Cocoa powder "A" was from the same sample as used in Example I.

EXAMPLE IV

In comparison also a chocolate pudding was prepared with cocoa power "B", corresponding to the cocoa powder that was used in Example II, in the same way and following the same recipe as in Example III. The gel strength of this pudding amounted to 31.7 g, when measured under the same conditions as in Example III.

EXAMPLE V

The cocoa of the invention can be obtained by submitting whole cocoa beans, or broken and deshelled cocoa beans (cocoa nibs), to processing which on the one hand results in a cocoa of the intense color as described but which also is conducted in such a way as to preserve the simple polyhydroxyphenols content at the desired level, i.e. at least about 0.25% by weight. To this end it is preferred to make use of whole deshelled cocoa beans or a coarse fraction of cocoa nibs and to adjust the processing conditions so that about 75 to 125 ml of processing liquid of an alkali content equivalent to 24% by weight of potassium carbonate are absorbed per kg of the deshelled cocoa beans or cocoa nibs. If a processing liquid of a different concentration is used the 75 to 125 ml are to be adapted accordingly. It is also preferred to dry the beans or nibs between about 4-15 min after they have been subjected to the processing liquid. The processing liquid, which can be a solution of usual alkalis, like NaOH, KOH, $Na_2CO_3$, $K_2CO_3$, preferably has a concentration equivalent to at least 20% by weight of $K_2CO_3$. The following is a suitable process for the manufacture of the cocoa of the invention.

Deshelled and broken cocoa kernels which did not pass a sieve with a size of mesh of 4 mm were sprayed on a stainless steel conveyor belt with a hot concentrated processing liquid consisting of a 24% by weight potassium carbonate solution. The conveyor speed was adjusted at 0.5 m/min and the volume of processing liquid which was sprayed per unit of time was adjusted 50 ml/min, resulting in the absorption of 100 ml processing liquid per kg deshelled and broke cocoa kernels. At a three meters' distance from the moistening zone the cocoa kernels were dried by means of infrared radiation. The interval between moistening and drying was 6 minutes. The dried processed cocoa kernels were roasted at 130° C. for 30 minutes, coarse ground in a disc and pin mill and fine milled to a mass in a ball mill. The fine milled cocoa mass is then pressed to remove cocoa butter and the press cake pulverized to a powder.

The resulting cocoa powder had a fat content of 13.7%, a moisture content of 3.9%, a pH (when measured in 10% water suspension) of 7.8 and a simply polyhydroxyphenols content of 0.30%. The L-value, when measured in an agar-jellified suspension, amounted to 15.2. The cocoa powder was used to prepare chocolate flavored milk was described in Example I. The sterilized finished product did not present any curdling phenomena. A chocolate pudding, which was prepared with this cocoa powder according to the recipe of Example III had a gel strength of 38.1 g. The result of the process described here can be modified; as a matter of fact the interval between moistening with the processing liquid and drying determines the color on the one hand and the simple polyhydroxyphenols content of the cocoa on the other. Hence it may be necessary, depending on the properties of the cocoa beans used, the capacity of the infrared radiators, the concentration of the processing liquid, etc., to adjust the time interval between moistening and drying. The optimum can be found in a simple way by measuring the color coordinates of the resulting cocoa powder and determining its simple polyhydroxyphenols content as indicated above.

What is claimed is:

1. A cocoa having a Hunterlab Digital Color Difference Meter color coordinate L of 16.0 or less and a simple polyhydroxyphenols content of at least about 0.25% by weight.

2. A cocoa as in claim 1 wherein the simple polyhydroxyphenols content is at least 0.30% by weight.

3. An edible composition comprising a food product admixed with a cocoa, wherein said cocoa has a Hunterlab Digital Color Difference Meter coordinate L of 16.0 or less and a simple polyhydroxyphenols content of at least about 0.25% by weight.

4. An edible composition as in claim 3 wherein the food product is milk.

5. An edible composition as in claim 3 wherein the food product is skim milk.

6. An edible composition as in claim 3 wherein the food product is ice cream.

7. An edible composition as in claim 3 wherein the food product is a dry milk concentrate such that a chocolate flavored ice cream is obtained when the edible composition is hydrated.

8. An edible composition as in claim 3 wherein the food product is pudding.

9. An edible composition as in claim 3 wherein the food product is milk or a dry milk concentrate such that a chocolate flavored pudding is obtained when the edible composition is combined with sugar, a starch, and carrageenan; heated with stirring; cooled with stirring; and allowed to stand.

10. An edible composition comprising a food product admixed with a cocoa, wherein said cocoa has a Hunterlab Digital Color Difference Meter coordinate of L of 16.0 or less and a simple polyhydroxyphenols content of at least about 0.30% by weight.

11. An edible composition as in claim 10 wherein the food product is milk.

12. An edible composition as in claim 10 wherein the food product is skim milk.

13. An edible composition as in claim 10 wherein the food product is ice cream.

14. An edible composition as in claim 10 wherein the food product is a dry milk concentrate such that a chocolate flavored ice cream is obtained when the edible composition is hydrated.

15. An edible composition as in claim 10 wherein the food product is a pudding.

16. An edible composition as in claim 10 wherein the food product is milk or a dry milk concentrate such that a chocolate flavored pudding is obtained when the edible composition is combined with sugar, a starch, and carrageenan; heated with stirring; cooled with stirring; and allowed to stand.

17. A method for the preparation of an improved cocoa having a Hunterlab Digital Color Difference Meter color coordinate L of 16.0 or less and a simple polyhydroxyphenols content of at least about 0.25% by weight comprising the steps of:
   (a) moistening whole deshelled cocoa beans (or a coarse fraction of cocoa nibs) with a hot concentrated alkaline processing liquid so that the processing liquid does not penetrate completely into the beans or nibs;
   (b) drying the moistened cocoa beans or nibs;
   (c) roasting the dried cocoa beans or nibs;
   (d) coarse grinding the roasted cocoa beans or nibs;
   (e) fine milling the ground cocoa beans or nibs;
   (f) pressing the fine milled cocoa beans or nibs in a filter press so as to remove cocoa butter and form a press cake; and
   (g) pulverizing the press cake to form cocoa powder.

18. The method of claim 17 in which the processing liquid has an alkali content equivalent to at least 20% by weight of potassium carbonate.

19. The method of claim 17 in which the processing liquid has an alkali content equivalent to about 24% by weight of potassium carbonate and about 75 milliliters to about 125 milliliters of processing liquid are absorbed per kilogram of cocoa beans or cocoa nibs.

20. The method of claim 17 in which the cocoa beans or cocoa nibs which have been moistened with the processing liquid are dried after an interval of about 4 to about 15 minutes.

* * * * *